(12) United States Patent
Hogan et al.

(10) Patent No.: US 6,704,689 B1
(45) Date of Patent: Mar. 9, 2004

(54) COMPLEXITY INDEX METHODOLOGY FOR THE ANALYSIS OF RUN LIFE PERFORMANCE

(75) Inventors: James R. Hogan, Bartlesville, OK (US); Olegario S. Rivas, Bartlesville, OK (US)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/488,474

(22) Filed: Jan. 20, 2000

(51) Int. Cl.[7] .............................................. G06F 17/60
(52) U.S. Cl. ...................... 702/184; 702/182
(58) Field of Search .................. 702/179–185, 702/6, 33–36, 81–84, 113–115, 123, 133, 137, 158, 166, 170, 187, 188, FOR 145–FOR 148, FOR 170, FOR 171, FOR 123–FOR 125, FOR 134, FOR 135, FOR 137, FOR 139; 700/109, 110, 175, 177; 340/679, 680; 703/6, 7; 706/904, 912, 20; 708/813, 814

(56) References Cited

U.S. PATENT DOCUMENTS

| | | | | |
|---|---|---|---|---|
| 5,210,704 A | * | 5/1993 | Husseiny | 702/34 |
| 5,239,486 A | * | 8/1993 | Mortier | 702/184 |
| 5,251,144 A | * | 10/1993 | Ramamurthi | 700/177 |
| 5,608,845 A | * | 3/1997 | Ohtsuka et al. | 702/34 |
| 6,349,268 B1 | * | 2/2002 | Ketonen et al. | 340/588 |
| 6,401,056 B1 | * | 6/2002 | Sirois | 702/183 |

* cited by examiner

*Primary Examiner*—Hal Wachsman
(74) *Attorney, Agent, or Firm*—Van Someren, PC; Jeffrey E. Griffin; Brigitte Jeffrey Echols

(57) ABSTRACT

A system and method for predicting a specific aspect, such as run life, of a component or system. The system utilizes a variety of complexity index values that are assigned to each component of the system. Each complexity index value is determined according to select physical parameters of the component. The summing of the complexity index values provides a system complexity index value that can be used to accurately estimate, for example, the run life of the system.

21 Claims, 5 Drawing Sheets

| Components | CI | Equipment Design |
|---|---|---|
| PUMP | 8.20 | 22'/stg=136 stg=153 stg, 80 Hsg, pump |
| INTAKE | 2.43 | Type 70 Intake |
| PROTECTOR | 3.82 | LSB 400/456 protector |
| MOTOR | 4.28 | .26 hp/stg=39.8=50 hp 456 SX motor |
| | 18.73*(4/4)=18.73 | |

FIG. 2A

| Components | CI | Equipment Design |
|---|---|---|
| PUMP | 10.87 | 22'/stg=227 stg=229 stg, 120 Hsg, pump |
| INTAKE | 4.43 | Intake |
| PROTECTOR | 3.82 | LSB 400/456 protector |
| MOTOR | 4.59 | .26 hp/stg=59.5=62.5 hp 456 SX motor |
| | 23.71*(4/4)=23.71 | |

FIG. 2B

| Components | CI | Equipment Design |
|---|---|---|
| | | 22'/stg=138 stg=325 stg, 170 Hsg, |
| PUMP | 8.20 | = stg, 80 Hsg pump |
| PUMP | 8.87 | = stg, 90 Hsg pump |
| INTAKE | 2.43 | Type 70 Intake |
| PROTECTOR | 3.82 | LSB 400/456 protector |
| MOTOR | 5.37 | .26 hp/stg=84.5=88 hp 456 SX motor |
| | 28.69*(5/4)=35.86 | |

FIG. 2C

COMPLEXITY INDEX TABLE

| PART | SERIES | CI |
|---|---|---|
| INTAKE | 338 | 1 |
| INTAKE | 400 | 1.4 |
| INTAKE | 540 | 2.3 |
| INTAKE | 562 | 2.77 |
| INTAKE | 675 | 3.99 |
| MOTOR | 375 | 1 |
| MOTOR | 456 | 1.48 |
| MOTOR | 540 | 2.1 |
| MOTOR | 562 | 2.25 |
| MOTOR | 738 | 3.87 |
| PROTECTOR | 325 | 1 |
| PROTECTOR | 375 | 1.33 |
| PROTECTOR | 400 | 1.51 |
| PROTECTOR | 540 | 2.49 |
| PROTECTOR | 562 | 3 |
| PROTECTOR | 738 | 5.16 |
| PROTECTOR | 950 | 8.54 |
| PUMP | 338 | 1 |
| PUMP | 400 | 1.4 |
| PUMP | 538 | 2.53 |
| PUMP | 540 | 2.3 |
| PUMP | 562 | 2.77 |
| PUMP | 675 | 3.99 |
| PUMP | 862 | 6.52 |
| PUMP | 950 | 7.9 |
| PUMP | 1000 | 8.75 |
| PUMP | 1125 | 11.08 |

FIG. 3

COMPLEXITY INDEX METHODOLOGY FOR THE ANALYSIS OF RUN LIFE PERFORMANCE

FIELD OF THE INVENTION

This present invention relates generally to a methodology for the derivation and use of dimensional values for qualities that are not normally dimensionally defined, and particularly to a methodology that may be utilized in estimating, for example, the run life of components or systems of components.

BACKGROUND OF THE INVENTION

In many environments, systems and applications, it is difficult to predict with any accuracy the ultimate occurrence of specific events. For example, the estimation of run life for virtually any machine, system, component or application is difficult. The accumulation of data, e.g. run time till failure, for a specific device or component permits the determination of an average run life. However, if the complexity of the device or component is changed, or additional components are added to form a system, the run life of the component and/or system once again becomes largely unpredictable. Any predictability tends to be derived from consistent data obtained on the actual use and failure of a statistically significant number of same or similar components or systems.

It would be advantageous to have a methodology that could be utilized on a computer, for example, to more accurately predict non-dimensional parameters or events, such as run life.

SUMMARY OF THE INVENTION

The present invention relates to a method for accurately estimating a service life of a system having a plurality of components. The methodology includes establishing a complexity index value for each component of a system of components. The complexity index value is established by comparing one or more component parameters of each component to reference parameters of a corresponding reference component. The methodology further includes adding the complexity index values of the plurality of components to obtain a system complexity index value. Further, the method includes estimating a run life based on the system complexity index value.

According to another aspect of the invention, a system is provided for determining an output value related to a service parameter of a device. The system includes an interface to permit the entering of information related to the physical description of the device. The system typically is utilized on a computer and includes a comparison module able to compare parameters of the device to corresponding parameters of a reference device to obtain a comprehensive complexity index. Additionally, a correlation module is configured to correlate the complexity index with an output value related to the active service life of the device. Also, a display is utilized to permit a user to view the output value.

According to another aspect of the present invention, a method is provided for utilizing physical dimensional parameters as a predictor of an aspect of the operation of a device. The method includes selecting one or more dimensional parameters for a device, and comparing the one or more dimensional parameters to one or more corresponding reference parameters. The method further includes deriving a complexity index based on the comparison, and utilizing the complexity index to predict a desired operational aspect of the device.

According to yet another aspect of the present invention, a method is provided for predicting the run life of a downhole pumping system utilized in pumping a production fluid from a well. The method includes assigning a complexity number to each component of a well-related pumping system. The complexity number reflects the relative complexity of a given component to a reference component based on corresponding physical parameters. The method further includes adding together the complexity number of each component to obtain a comprehensive complexity index, and predicting the run life of the well-related pumping system based on the comprehensive complexity index.

BRIEF DESCRIPTION OF THE DRAWINGS

The invention will hereafter be described with reference to the accompanying drawings, wherein like reference numerals denote like elements, and:

FIG. 2 provides specific examples of the calculation of various system complexity index values;

FIG. 3 provides a table of predetermined complexity index values for a variety of components that can be utilized in an exemplary submersible pumping system;

DETAILED DESCRIPTION OF THE PREFERRED EMBODIMENTS

The present system and method utilize what can be referred to as the "complexity" of a component or components as a general predictor of some aspect of an individual component or system of components. In the discussion below, the present system and methodology are explained in detail in conjunction with the specific example of predicting run life for an electric submersible pumping system used to pump subterranean fluids, such as oil. However, this exemplary use should not be construed as limiting, because the present system and method have potential application in a wide variety of components, systems, and applications.

Figure 1:
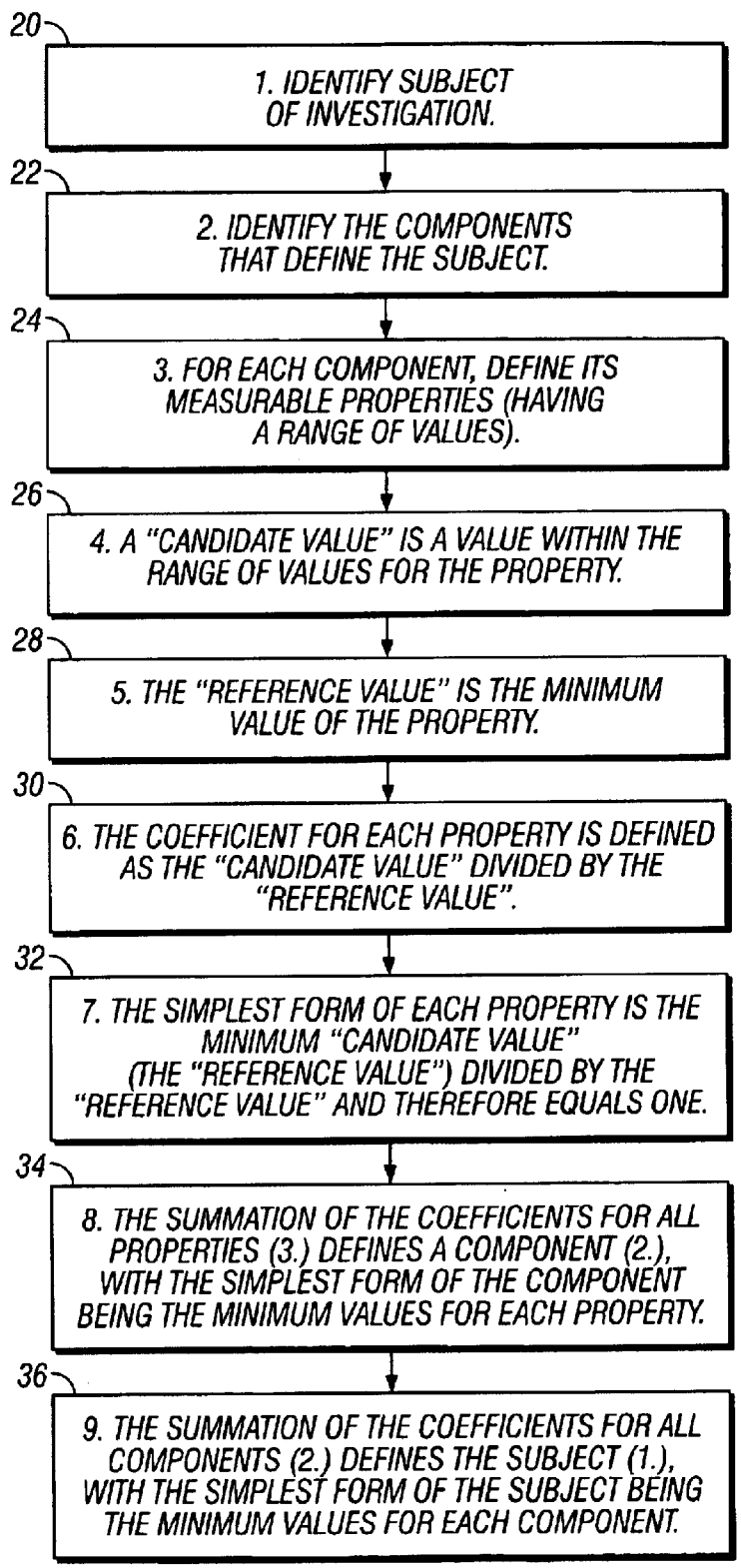
FIG. 1 is a flow chart illustrating the general methodology used to predict a desired operational aspect of the component or system of components.

A generic methodology is outlined via a series of steps arranged as a flow chart in FIG. 1. Initially, a subject of investigation is identified, as illustrated in block 20. Then, each of the components of the subject are identified, as represented in block 22. As discussed below, an exemplary subject is an electric submersible pumping system, and exemplary components are a pump, an intake, a protector and a motor, that form a given submersible pumping system.

For each component, a set of measurable properties are defined, as represented in block 24. The measurable properties typically have a range of values depending on alternate selections of a given component. For example, submersible pumps may be available in a range of diameters and lengths. Each measurable property of a component has a specific value, that can be referred to as a candidate value, as represented in block 26. Each candidate value, of course, falls somewhere within the range of values for that particular measurable property.

The minimum value within the range of values for a given measurable property is referred to as the reference value, as illustrated in block 28. By way of example, the reference value for a property, such as a pump diameter, is the smallest pump diameter for a series of submersible pumps.

A coefficient for each property is then defined, as represented in block 30. The coefficient for each property is the candidate value divided by the reference value. This coefficient is sometimes referred to as the complexity coefficient used in driving a complexity index for a given component. The least or lowest complexity coefficient for each property is the minimum candidate value or reference value divided by the reference value, as represented in block 32. In other words, the coefficient assigned to the simplest or least complex form of a given property is equal to one.

Summing the coefficients for each property of the subject component defines that particular component in a measurable manner, as referenced in block 34. This summation of coefficients can be referred to as a complexity index for a given component. The complexity index measures the complexity of a given component relative to the simplest form of the component, defined as the component having the minimal values for each property measured.

By adding the summation of coefficients for each component, the overall subject is defined, as represented in block 36. In many systems and applications, this summation can be described as the summation of the complexity indices for each component. This provides a subject or system complexity index that can accurately be utilized as a predictor with respect to the subject or system. For example, the run life of a submersible pumping system can be readily predicted by the subject or system complexity index.

Initially, the component complexity indices and system or subject complexity index are applied against known data on the component and/or subject to verify the accuracy and usefulness of the measured properties in indicating a desired operational aspect of the subject. Once the properties and values are verified against known data of the subject, the methodology can be used to evaluate performance, e.g. run life, throughout a generated range of values for other sizes and grades of each component as well as for other combinations of components in the overall subject, e.g. system.

Referring generally to Table A below, an exemplary implementation of the present methodology is illustrated in a table of relationships and values that apply to components of a system. In this example, the system is an electric submersible pumping system of the type utilized in pumping, for example, oil from a well. A typical electric submersible pumping system includes a pump (block 38), an intake (block 40) through which wellbore fluids are drawn into pump 38, a motor protector (block 42) and an electric motor (block 44). In this example, there are a variety of measurable properties 46. The specific properties for each component may vary, but they are measurable, physical properties that relate to the run life of the component.

TABLE A

|  | Diameter (1) | Shaft (2) | Length (3) | Mechanical (4) | Electrical (5) |
|---|---|---|---|---|---|
| Pump | Series O.D.$^2$-c | N.A. | Length c | Mech c$^a$ | N.A. |
|  | Series O.D.$^2$-r |  | Length r | Mech r$^a$ |  |
| Intake | Series O.D.$^2$-c | N.A. | Length c | Mech c$^b$ | N.A. |
|  | Series O.D.$^2$-r |  | Length r | Mech r$^b$ |  |
| Protector | Series O.D.$^2$-c | Shaft O.D.$^2$-c | Length c | Mech c$^c$ | N.A. |
|  | Series O.D.$^2$-r | Shaft O.D.$^2$-r | Length r | Mech r$^c$ |  |
| Motor | Series O.D.$^2$-c | N.A. | Length c | Mech c$^d$ | Electrical c |
|  | Series O.D.$^2$-r |  | Length r | Mech r$^d$ | Electrical r | c = Candidate component
r = Reference component
(1) Relating to pressure acting on the rotors/impellers
Intakes: This value will be 0 (zero) for static intakes because there are no moving parts.
Protectors: Are subject to greater loads with an increase in O.D.
(2) Protector: Related to the sealing abilities of the shaft seals. Sealing is a function of the perimeter, therefore of the O.D. of the shaft.
(3) Relates to the length of the component. Each components "Reference" length is the length of the simplest (shortest) piece for that component. The "Candidate" piece is the piece for which the index number is being calculated.
(4) Mechanical relates to the distance between bearings.
$^a$For pumps; (Candidate max length/max stages)/(Reference max length/ref. Max stages)
$^b$For intakes; C. length/R. length with static intakes = 0.
$^c$For protectors; C. length/R. length
$^d$For motors; (c. max length/c. max rotors)/(r. max length/r. max rotors)
(5) Electrical is related to the amount of work per foot (Hp) involving temperature rise.

For example, diameter, length and certain mechanical aspects of the pump are utilized in determining the component complexity index for a given submersible, centrifugal pump. With respect to diameter, the contributing coefficient for that property is determined by taking the square of the candidate value, i.e. the outside diameter of the actual pump used in the system, divided by the square of the reference value, e.g. reference outside diameter. The reference OD is obtained from the pump having the smallest outside diameter and available for the same type of pumping application. The coefficient for length is determined by dividing the length of the candidate pump by the length of the reference pump. The reference pump is the shortest available pump. The mechanical coefficient is determined by dividing the maximum length of the candidate pump by the maximum number of pump stages and dividing the resultant quotient by a corresponding quotient for the reference pump. By adding the three coefficients, diameter, length and mechanical, the complexity index for the candidate pump is determined. It should be noted that in a typical situation there are a variety of individual components to choose from in constructing the overall electric submersible pumping system. Additionally, the components typically come in a range of diameters for placement in a variety of wellbores.

The pump intake complexity index also is calculated from coefficients based on diameter length and mechanical. For intakes, however, the mechanical coefficient is derived from dividing the length of the candidate intake by the length of the reference intake with static intakes being given a coefficient of zero.

As further illustrated in Table A, a motor protector complexity index is determined by adding the coefficients related to the properties of diameter, length, mechanical and also shaft. The shaft coefficient is determined by dividing the shaft outside diameter of the candidate protector by the shaft outside diameter of the reference protector. In calculating the mechanical coefficient for protectors, the candidate length is divided by the reference length.

In calculating the complexity index for motor 44, the coefficients of the properties related to diameter, length, mechanical and electrical are summed. In this instance, the mechanical coefficient is derived through division of the maximum length of the candidate motor by the maximum number of rotors in the candidate motor and further dividing the resultant quotient by the corresponding quotient of the reference motor. The electrical coefficient is calculated by dividing the work per foot or horsepower of the candidate motor by the horsepower of the reference motor.

Three different exemplary electric submersible pumping systems are illustrated in the table of FIG. 2. In this table, the three pumping systems are labeled A, B and C. In the first column, individual components of the three systems are listed. In the second column the complexity index for each component is listed and has been derived by summing the coefficients as discussed with reference to Table A. In column 3, information about the component type has been listed. Each of the components listed in this particular example is available from Reda Pump Co. of Bartlesville, Okla.

Systems A and B each use a pump, intake, protector and motor, but the pumps, intakes and motors have different measurable properties. Accordingly, the overall complexity index of each system is different, with system A having an overall index of 18.73 and system B having an overall index of 23.71.

Example systems A and B utilize the simplest system necessary for pumping a production fluid from a well in that only a single pump, single intake, single protector and single motor are utilized. In example C, the system has greater complexity due to an additional pump that results in a five component system having two pumps. When the complexity of the system goes beyond the base or simplest system available, the complexity index for the additional component or components is summed with the other component complexity indices. Further, the resultant sum is multiplied by a factor derived from the number of components in the actual system divided by the number of components in the simplest or least complex system. Thus, the addition of individual component complexity indices results in 28.69, but the actual system complexity index is determined by multiplying that sum by 5/4 to obtain a system complexity index of 35.86.

When a company, for instance, has a variety of available components with known measurable property values, the component complexity indices can be pre-calculated, as illustrated in the table of FIG. 3. Thus, a company can determine the complexity index for each of its system components facilitate computation of the overall system complexity index when individual components are selected and combined. However, if certain components are obtained elsewhere, the complexity index for that particular component can readily be calculated by summing the coefficients obtained from measurable properties as described with respect to Table A.

Figure 4:
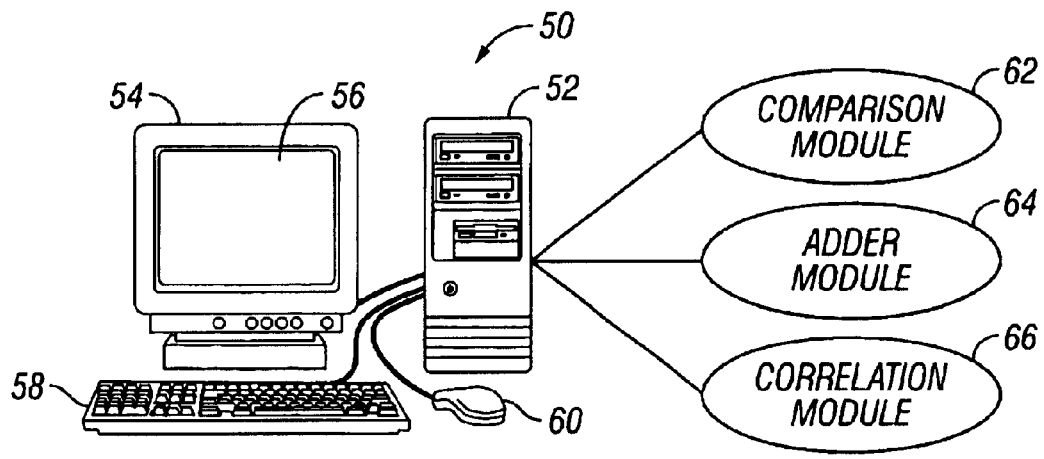
FIG. 4 is a schematic illustration of an exemplary computer system that can be utilized in carrying out the predictive methodology.
Figure 5:
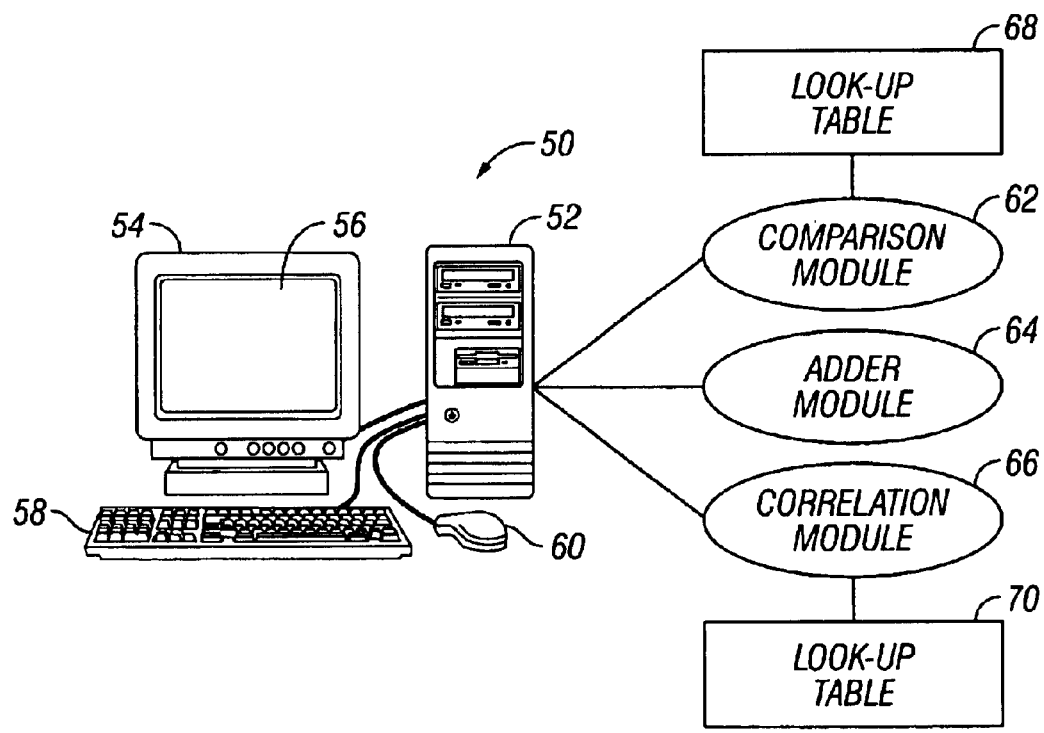
FIG. 5 is a schematic view similar to that of FIG. 5 but having additional features.

The methodology described above typically is carried out on a computer. As illustrated in FIGS. 4 and 5, an exemplary computer system 50 may comprise a personal computer having a computer 52 operatively coupled to, for example, a monitor 54 having a display screen 56, a keyboard 58 and a mouse 60. The display screen 56, keyboard 58 and mouse 60 may be used as an interface to permit the entering of information related to the candidate device or system. Of course, other interfaces or systems, available now or in the future, can be used to enter data. The exemplary display screen 56 further serves as a display by which a user can view the output values or other information.

The methodology typically is embodied in software and includes three basic modules, a comparison module 62, an adder module 64 and a correlation module 66. The comparison module 62 is configured to compare parameters or properties of a candidate device to the corresponding properties of a reference device to obtain the appropriate coefficients used in deriving the component complexity index. Preferably, the comparison module 62 includes a lookup table 68 which can be used for pre-established component complexity indices, as illustrated in FIG. 3, for specific components that may be selected by a user of system 50. Thus, comparison module 62 permits an individual to automatically obtain the component complexity index for pre-catalogued components or to have the component complexity index calculated from individual property coefficients by entering the appropriate dimensional values for each candidate component property that contributes to the component complexity index.

Adder module 64 is utilized in summing the coefficients, if any, to obtain the individual component complexity indices, and it is utilized in adding the component complexity indices to derive the overall subject or system complexity index. Additionally, the adder module 64 is utilized in adjusting the sum of the component complexity indices, where necessary. For example, if the system includes a greater number of components than the base system, as discussed with reference to example C of FIG. 2 of him, then adder module 64 makes an appropriate adjustment to obtain the system complexity index. Similarly, the adder module can be programmed to make appropriate adjustment to the sum of the component complexity indices for other factors, such as factors related to environment. For example, adjustments may be made according to the specific type of production fluid produced, the depth at which the electric submersible pumping system operates, and the heat and/or pressure affecting the system.

The correlation module 66 is configured to correlate the complexity index with an output value related to the aspect being predicted. In the specific example of an electric submersible pumping system, the aspect typically is run life of the system. In one exemplary embodiment, correlation module 66 cooperates with a lookup table 70 that includes the values for expected service life that correlate to a given system complexity index value. Those values typically are determined and verified by actual data on the run life of specific components and systems that have been used in the field.

Figure 6:
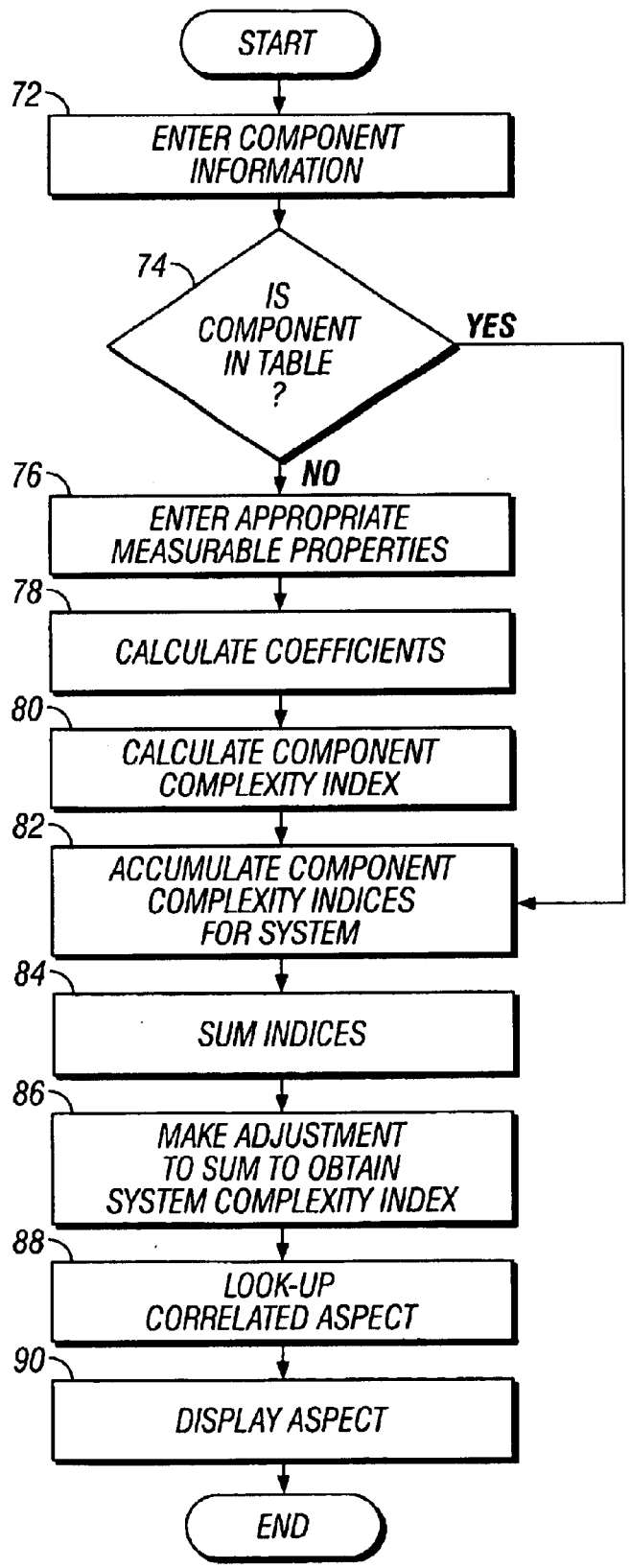
FIG. 6 is a flow chart for carrying out the predictive methodology in, for example, a computer.

A flow chart for implementing the methodology on system 50 is illustrated in FIG. 6. This flow chart is merely exemplary and should not be construed as limiting. The sequences and steps may be adjusted to accommodate the prediction of a given aspect in a variety of applications and according to a variety of strategies. In the illustrated approach, a user is initially prompted via a display, such as display screen 56, to enter information on one or more components, as referenced in block 72. Typically, a given aspect, e.g. run life, is desired for a system, and information is entered on a plurality of components. For each component, a check is made whether the component complexity index has been pre-established in, for example, lookup table 68, as referenced in decision block 74. If the component complexity index has not been pre-established, the user is prompted to enter the parameters or properties for the specific component, as referenced in block 76. The coefficient for each property is then calculated (see block 78) as described above, for example, with reference to Table A. The component complexity index is then calculated by summing the coefficients as referenced in block 80. Ultimately, the component complexity indices for the entire system, e.g. electric submersible pumping system, are accumulated, as illustrated by block 82. If, on the other hand, one or more of the components is available in a lookup table at step 74, that component complexity index is immediately made available for accumulation, as referenced in block 82.

When the component complexity indices are accumulated, those indices are summed, as referenced in block 84. If necessary, corrections or adjustments are made to the sum, as referenced in block 86. Such corrections or adjustments may be necessary when a greater number of components are utilized in the system than necessary in the simplest system or to accommodate other factors, such as environment. The corrected sum provides a subject or system complexity index that can be correlated with a desired aspect, such as run life. In an exemplary system, the correlated aspect may be maintained in a lookup table, such as lookup table 70, referenced in block 88. The desired aspect, e.g. run life, may then be displayed for the user on a display, such as display screen 56, as referenced in block 90.

It will be understood that the foregoing description is of preferred exemplary embodiments of this invention, and that the invention is not limited to the specific forms shown. For example, the general methodology can be applied to a variety of applications, including individual devices or components, systems of components, and other types of systems, such as financial systems, workforce or employee systems, technical systems, etc. that require a method for predicting a certain aspect. Additionally, the methodology may be carried out on other systems or in conjunction with additional applications. Also, the reference components need not be the least complex provided potential coefficients of less than one are acceptable. These and other modifications may be made in the design and arrangement of the elements without departing from the scope of the invention as expressed in the appended claims.

What is claimed is:

1. A system for determining an output value related to a service parameter of a device, comprising:
   an interface to permit the entering of information related to physical parameters of the device when the device is in a desired operational condition;
   a comparison module able to compare physical parameters of the device to corresponding physical parameters of a reference device to obtain a comprehensive complexity index;
   a correlation module configured to correlate the comprehensive complexity index with an output value related to the active service of the device; and
   a display by which a user can view the output value.

2. The system as recited in claim 1, wherein the comparison module is embodied in software.

3. The system as recited in claim 2, wherein the correlation module is embodied in software.

4. The system as recited in claim 3, wherein the interface comprises a keyboard.

5. The system as recited in claim 3, wherein the display comprises a computer display screen.

6. The system as recited in claim 1, wherein the device comprises a plurality of cooperating components.

7. The system as recited in claim 6, wherein the comparison module compares parameters of each component to corresponding parameters of reference components to obtain a unique complexity index for each component.

8. The system as recited in claim 7, further comprising an additive module able to add the unique complexity indices to obtain the comprehensive complexity index.

9. A system for determining an output value related to the operation of a device having a plurality of components, comprising:
   an interface to permit the entering of information related to physical parameters of each of the plurality of components when each of the plurality of components is in a desired operational condition; and
   a comparison module able to compare physical parameters of each component of the plurality of components to corresponding physical parameters of corresponding reference components to obtain a unique complexity index for each component.

10. The system as recited in claim 9, further comprising an additive module able to add the unique complexity indices to obtain a comprehensive complexity index.

11. The system as recited in claim 9, further comprising a correlation module configured to correlate the unique complexity index with an output value related to the active service of the device.

12. The system as recited in claim 11, further comprising a display by which a user can view the output value.

13. The system as recited in claim 12, wherein the comparison module is embodied in software.

14. The system as recited in claim 12, wherein the correlation module is embodied in software.

15. The system as recited in claim 12, wherein the display comprises a computer display screen.

16. The system as recited in claim 9, wherein the interface comprises a keyboard.

17. A system for determining an output value related to the operation of a device, comprising:
   means for permitting the entering of information related to physical parameters of the device when the device is in a desired operational condition;
   means for comparing physical parameters of the device to corresponding physical parameters of a reference device to obtain a comprehensive complexity index;
   means for correlating the comprehensive complexity index with an output value related to the active service of the device; and
   means for viewing the output value.

18. The system as recited in claim 17, wherein the means for permitting comprises a keyboard.

19. The system as recited in claim 17, wherein the means for comparing comprises a comparison software module.

20. The system as recited in claim 17, wherein the means for correlating comprises a correlation software module.

21. The system as recited in claim 17, wherein the means for viewing comprises a computer display.

* * * * *